Patented May 21, 1929.

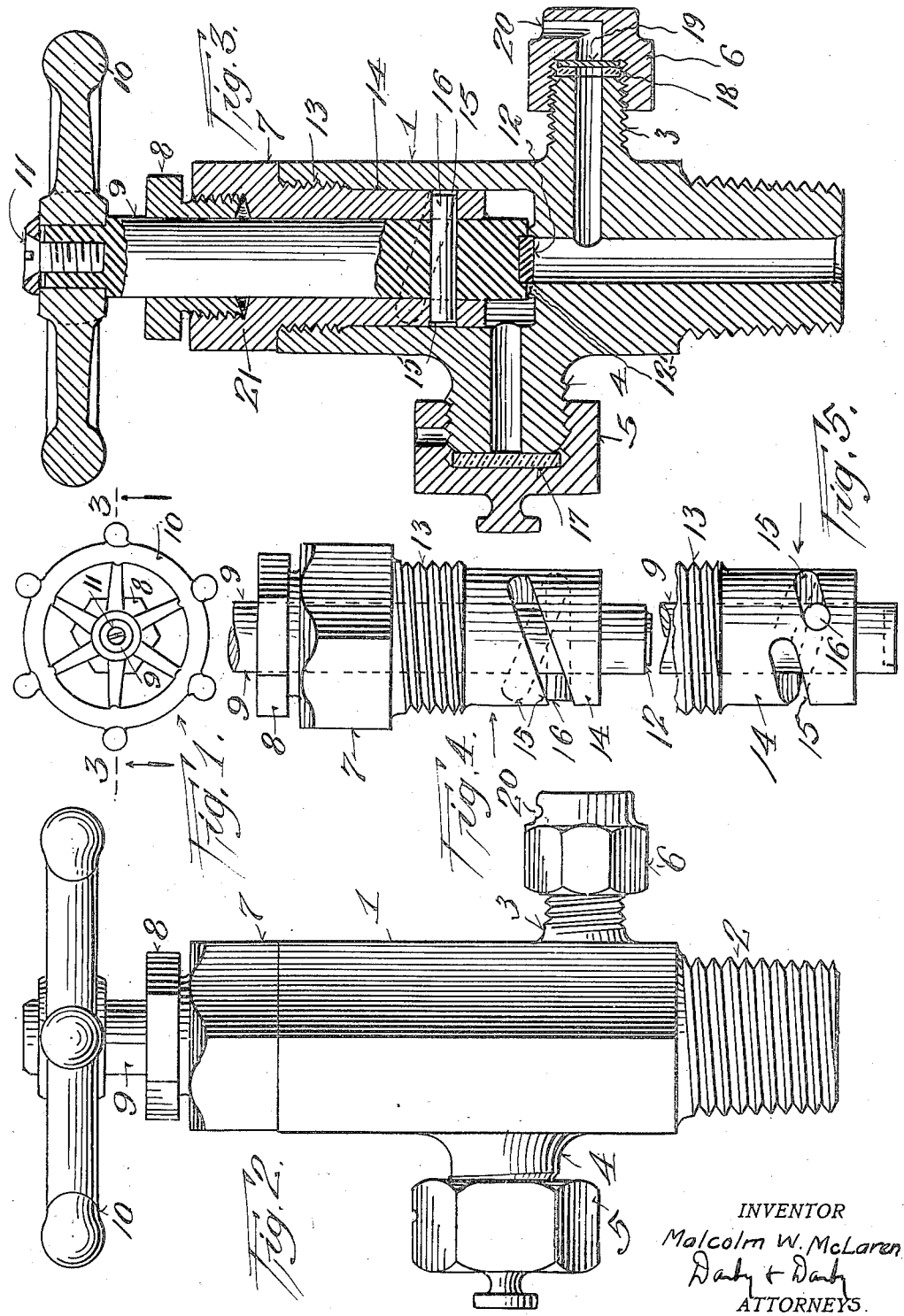

1,713,671

UNITED STATES PATENT OFFICE.

MALCOLM WATE McLAREN, OF JACKSON HEIGHTS, NEW YORK, ASSIGNOR, BY MESNE ASSIGNMENTS, TO FYRE FREEZ CORPORATION, A CORPORATION OF NEW YORK.

HIGH-PRESSURE VALVE.

Application filed June 16, 1926. Serial No. 116,315.

This invention relates broadly to a valve structure.

One of the objects of this invention is the provision of a valve particularly adapted for use in apparatus employing exceedingly high pressures.

One of the objects of this invention is the provision of a high pressure valve particularly adapted for use with high pressure fire extinguishing apparatus employing carbon dioxide gas.

A further object of this invention is the production of a valve which is adapted to be opened and closed very rapidly,—that is one which is moved from one extreme position to the other in a fraction of one revolution of the valve stem.

A still further object of this invention is the production of a valve which is so constructed that the valve head, when it closes the valve seat, contacts with the seat at all points at the instant of closing.

A still further object of this invention is the provision of a valve which is perfectly balanced and equalized.

Another object of the invention is the provision of a valve which is simple and easy to construct, and efficient in operation and maintenance.

This invention resides substantially in the construction, combination, arrangement and relative location of parts, all as will be more fully pointed out hereinafter.

Referring to the drawings, in which the same reference numerals will be used throughout the several views to indicate the same or similar parts, Fig. 1 is a top plan view of the valve showing the hand wheel.

Fig. 2 is a side elevational view of the valve of this invention.

Fig. 3 is a vertical cross sectional view of the valve taken on the line 3—3 of Fig. 1.

Fig. 4 is an enlarged side elevational view with some parts broken away, showing the means for operating the valve stem to and from its seat.

Fig. 5 is an enlarged side elevational view of the structure of Fig. 4, looking at it at right angles to the view of Fig. 4.

In connection with high pressure fire extinguishing apparatus of the type, for instance, which employs carbon dioxide gas as the extinguishing element, it is particularly desirable to control the gas in the high pressure tank by means of a quick acting valve. To insure satisfactory operation of such apparatus, it is advantageous to have a valve which quickly seats and unseats.

In the usual form of construction, the valve head in closing on its seat, usually contacts at one point, due to the throw of the threads, permitting the escape of fluid past the parts not yet firmly in contact. This tends to wear out the valve parts, and produces undesirable strains in its structure. The valve of this invention has been produced to overcome these difficulties, as will readily appear from the following description.

In the figures, there is shown at 1, the main body portion of the valve, which has an integral threaded extension 2, for attachment to the gas container. At the side the threaded projection 3 is in communication with the central bore of the valve body, and is closed off at its end by means of a cap 6, which securely clamps between the washer 18 and itself a frangible safety disc 19, of suitable material. This disc is adapted to be ruptured, if the pressure in the gas container exceeds a predetermined value, and the gas can escape through the opening 20 in the cap 6, without otherwise destroying the apparatus. Another threaded extension 4 is provided on the main body 1, of the valve, and is provided with a cap 5, which cooperates with the washer 17, to seal the passage leading through the projection 4 into the main body of the valve and upon the valve seat. This extension merely provides a point of connection with the fire extinguishing apparatus.

The upper portion of the main body of the valve is recessed out, and is provided for a short distance with threads 13, which serve to secure the hollow thimble 7 in place within the recess. The thimble 7 is in turn recessed at its upper end and threaded to receive the gland nut 8, which cooperates with the thimble 7 to provide the space 21, in which a suitable packing material may be placed. By adjusting the pressure on this packing material, leakage around the valve stem may be prevented. Rotatively and slidably mounted within the bore provided by the thimble 7, is the valve stem 9, having attached to its upper end, by means of the screw 11, an operating hand wheel 10. The lower end of the valve stem 9 is provided with a seat 12, made of suitable material, such as hard rubber, metal, leather, etc., which is adapted to cooperate with the seat 12' surrounding the central bore of the main body portion.

The lower end of the thimble 7 has an extension 14 beyond its threads 13, in which two inclined slots 15 are provided in the walls thereof. A short yoke pin 16, which extends through a hole in the valve stem 9, is adapted to project into these slots, so that upon rotation of the valve stem by means of the hand wheel, the pin slides in these slots to cause the valve to be opened or closed.

It will be seen that by properly designing the length of the slots and their inclination, the valve may be constructed to be fully opened or closed in a fraction of a revolution of the stem 9. The pressure on the valve stem is equalized and balanced, since the yoke pin is subjected to it at diametrically opposite points, so that no undue strains are set up in the valve structure.

While I have particularly mentioned this valve for use in connection with fire extinguishing apparatus, it is, of course, adapted for use in any high pressure apparatus, and when desirable, even in low pressure systems.

It is, of course, evident that many changes in the details of construction will readily suggest themselves to those skilled in the art, without involving invention, and it is not desired, therefore, to be limited to the particular form which I have shown in the drawings, as illustrating my invention, but rather to the spirit and scope thereof, as it is defined in the appended claim.

What I seek to secure by United States Letters Patent is:—

In a quick acting high pressure control device, a body unit having a bearing and a valve seat, a valve stem of uniform diameter mounted in the bearing of said body unit for rotative movement therein, said valve stem having a recess in the end thereof and a valve member rigidly secured therein to engage said seat, the bearing for said valve stem having slots at opposite sides thereof disposed in diametrically opposite and inclined relation to each other, and means extending from diametrically opposite sides of said valve stem and aligned with each other and respectively engaging in said slots.

In testimony whereof I have hereunto set my hand on this 12th day of June A. D., 1926.

MALCOLM WATE McLAREN